United States Patent
Rojas

(10) Patent No.: US 9,152,386 B1
(45) Date of Patent: Oct. 6, 2015

(54) METHOD AND SYSTEM FOR RAPID UPGRADE THROUGH TRANSACTIONAL ANALYSIS

(71) Applicant: TriZetto Corporation, Denver, CO (US)

(72) Inventor: Dustin Rojas, Aurora, CO (US)

(73) Assignee: TriZetto Corporation, Denver, CO (US)

( * ) Notice: Subject to any disclaimer, the term of this patent is extended or adjusted under 35 U.S.C. 154(b) by 124 days.

(21) Appl. No.: 13/793,090

(22) Filed: Mar. 11, 2013

(51) Int. Cl.
G06F 9/44 (2006.01)
G06F 9/445 (2006.01)

(52) U.S. Cl.
CPC ... *G06F 8/20* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 6,735,766 | B1* | 5/2004 | Chamberlain et al. | 717/173 |
| 2003/0051015 | A1* | 3/2003 | Brown et al. | 709/222 |
| 2005/0257214 | A1* | 11/2005 | Moshir et al. | 717/171 |
| 2010/0058313 | A1* | 3/2010 | Hansmann et al. | 717/168 |
| 2013/0074061 | A1* | 3/2013 | Averbuch et al. | 717/171 |

* cited by examiner

Primary Examiner — Lewis A Bullock, Jr.
Assistant Examiner — Jacob Dascomb
(74) Attorney, Agent, or Firm — Dawn-Marie Bey; Bey & Cotropia PLLC

(57) ABSTRACT

A process for identifying functional and detailed design decisions in a core software architecture across multiple applications and clients includes comparing the results of two independent review sub processes to rapidly build an upgrade testing matrix. The two sub process include an independent functional review and a regression analysis using data extracts from historical data generated from client use of the core software architecture.

20 Claims, 2 Drawing Sheets

METHOD AND SYSTEM FOR RAPID UPGRADE THROUGH TRANSACTIONAL ANALYSIS

FIELD OF THE EMBODIMENTS

The embodiments are generally directed to a system and process for providing upgrades to software implemented business processes. More particularly, the embodiments are directed to identifying usage characteristics, e.g., functional decisions and detailed designs by users of a core architecture, using an automated extraction process and providing upgrades in accordance with analysis thereof.

BACKGROUND OF THE EMBODIMENTS

After initial implementation and deployment of software, hosted (SaaS), client-resident or some combination thereof, there are inevitably changes or upgrades that are required to keep up with changing technical and business requirements. Many of such upgrades are driven by client usage characteristics. That is, software that supports and enables many varied and configurable end-user designs and functional decisions will likely require more frequent upgrades to keep pace with these constantly changing and evolving usage characteristics. There are numerous challenges to collecting and analyzing usage data across multiple clients and further challenges to testing and implementing universal and/or client targeted upgrades to the software in an efficient and productive manner. For example, in many cases, identifying functional and detailed design decisions related to software applications is an entirely manual process. That is, users must be queried and the responses collected and analyzed manually for further use in developing upgrades. This process is both time consuming and contains inaccuracies due to human error. Further, on a client by client basis, use cases differ. Some clients rely more heavily on certain applications in a suite than others. Similarly, clients may use certain functionality within a specific application with more frequency or in a client-specific configuration. It is nearly impossible to accurately discern this level of detail about client use of software using manual processes. Accordingly, testing scope tends to either be over-inclusive or contains inaccurate use scenarios.

Accordingly, there is a need in the art for an improved system and process for identifying functional and detailed design decisions in a core software architecture across multiple applications and clients in order to accelerate the identification of testing scope for software upgrades. More particularly, an improved process is needed for precision extraction of client standard implementation decisions to accelerate the timeframe for scope confirmation in order to dictate how transactions need to be administered to replicate client usage in order to identify test case selection.

SUMMARY OF THE EMBODIMENTS

In a first embodiment, a process for developing a final upgrade matrix for testing at least one upgrade to implementation of software use and configuration in an existing customer environment is described. The process includes: performing a review of the existing customer's perceived use of the software in the existing customer environment to populate an initial upgrade matrix with multiple initial transactions; performing by at least one extraction component a data extract process by a processor on a database containing historical data resulting from the existing customer's actual use of the software to determine actual historical transactions; comparing the multiple initial transactions with the actual historical transactions; and removing each of the multiple initial transactions that does not align with an actual historical transaction from the initial upgrade matrix, wherein the final upgrade matrix includes any remaining and aligned multiple transactions.

In a second embodiment, a process for determining individualized testing scope for one or more software upgrades for a first individual customer is described. The process includes: polling the first individual customer to populate a first initial testing scope matrix with first current use data; extracting first actual use data by a processor running extract scripts on a database containing first historical use data for the first individual customer; comparing the first current use data in the initial testing scope matrix with the first extracted actual use data to obtain first aligned data; and updating the first initial testing scope matrix to include only first aligned data, thereby forming a first final testing scope matrix.

In a third embodiment, a process for determining generalized testing scope for one or more software upgrades for multiple customers of the software provider is described. The process includes: polling each of the multiple customers to populate a generalized initial testing scope matrix with current use data; extracting actual use data by a processor running extract scripts on a database containing historical use data for each of the multiple customers; comparing the current use data in the generalized initial testing scope matrix with the extracted actual use data to obtain aligned data; and updating the generalized initial testing scope matrix to include only aligned data, thereby forming a final generalized testing scope matrix.

BRIEF DESCRIPTION OF THE FIGURES

The following figures are intended to be part of this disclosure and read in conjunction with the paragraphs herein.

DETAILED DESCRIPTION

Figure 1:
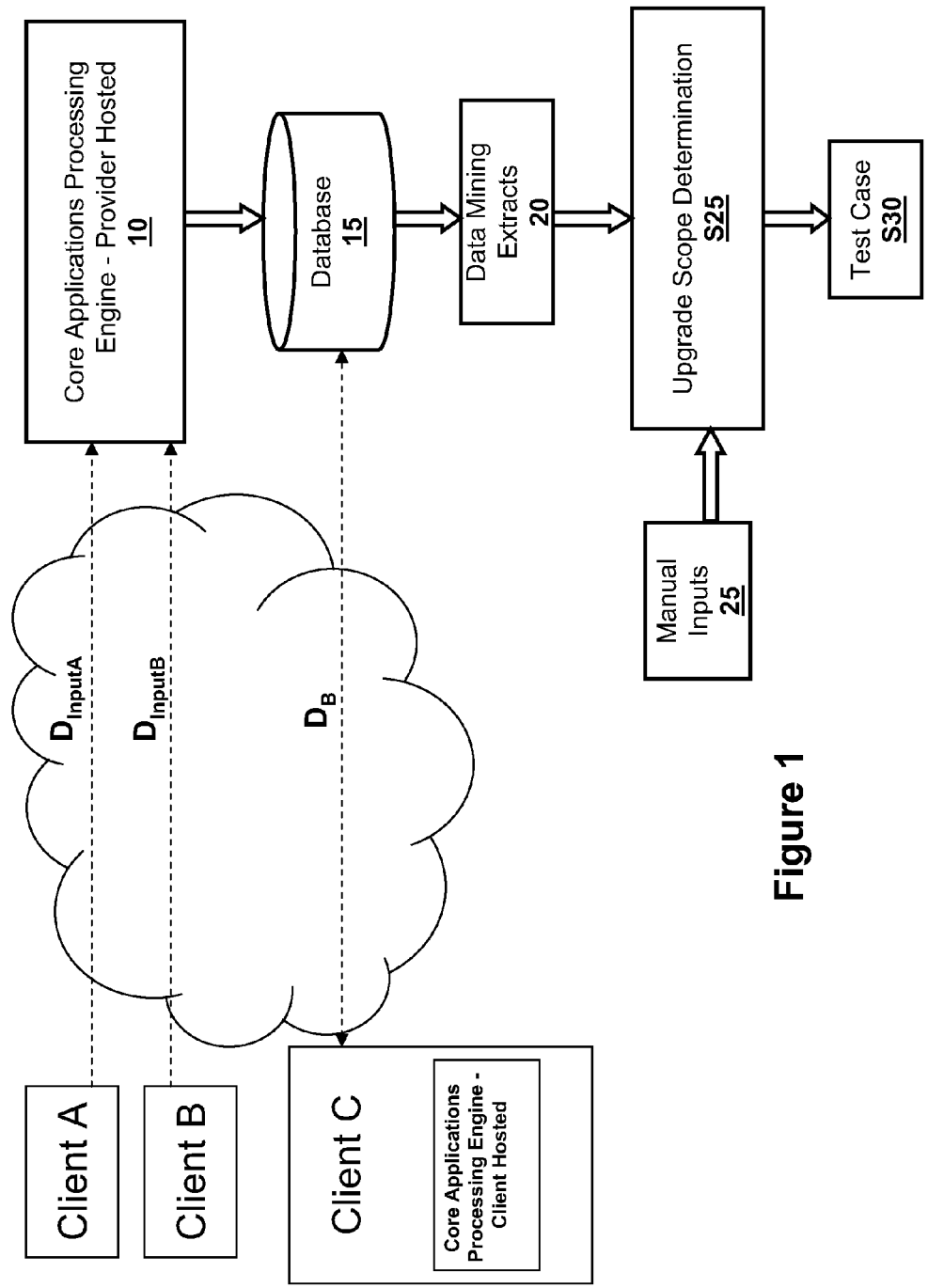
FIG. 1 is a general system and participant architecture in accordance with an embodiment described herein.

Referring to FIG. 1, an exemplary general system configuration for a software application suite offered to clients as either provider-hosted Software as a Service (SaaS) or as client hosted software. More particularly, Clients A and B are representative of clients who provide input data ($D_{InputA}$, $D_{InputB}$) to the provider hosted processing engine, while Client C is representative of clients who host the processing engine in-house (or as part of client controlled infrastructure) and thus perform processing in house. Client C does not necessarily provide input data to the provider, but rather allows for access to and or provides output data $D_{OutputC}$ for inclusion in provider database 15. The $D_{OutputA}$ and $D_{OutputB}$ are generated by the provider core processing engine 10 and stored in provider database 15. It should be noted that while a single database 15 is shown, this is for illustrative purposes only. One skilled in the art recognizes that multiple databases may be used. As described further herein, the output data $D_{OutputA}$, $D_{OutputB}$, $D_{OutputC}$ to $D_{OutputZ}$ (not limited) and features thereof may be used to facilitate more efficient software upgrades. Generally, this upgrade process is shown in FIG. 1 as upgrade scope determination S25 based on both extracts 20 from database 15 and manual input 25 and upgrade testing S30 (detailed below).

By way of a particular example, the software application suite may include applications and processing which facilitate the collection and processing of health care related data for the adjudication of health related claims for payment. Clients may include insurance companies, self funded employers or other entities needing such services. Exemplary software application suites existing at the time of this filing include, for example, TriZetto's FACETS and QNXT products. Similarly, the software application suite may include additional health care related functionality, such as benefits administration software for self-funded employers for managing administration of benefits plans and care management software, such as TriZetto's CareAdvance suite for managing insured population. Each individual application may be configured and/or utilized by different clients in different ways. Accordingly, a universal upgrade for all clients could fail to address such varied configuration and use and could even result in loss of availability of certain configurations and/or functionality. As such, identifying the universe of configurations and uses and either tailoring upgrades thereto or testing upgrades with the configurations and uses to ensure continued availability, is critical to continued success of the software. But, as is discussed briefly in the Background of the Embodiments, ascertaining the universe of different configurations and uses across multiple clients is a laborious and time consuming process.

Figure 2:
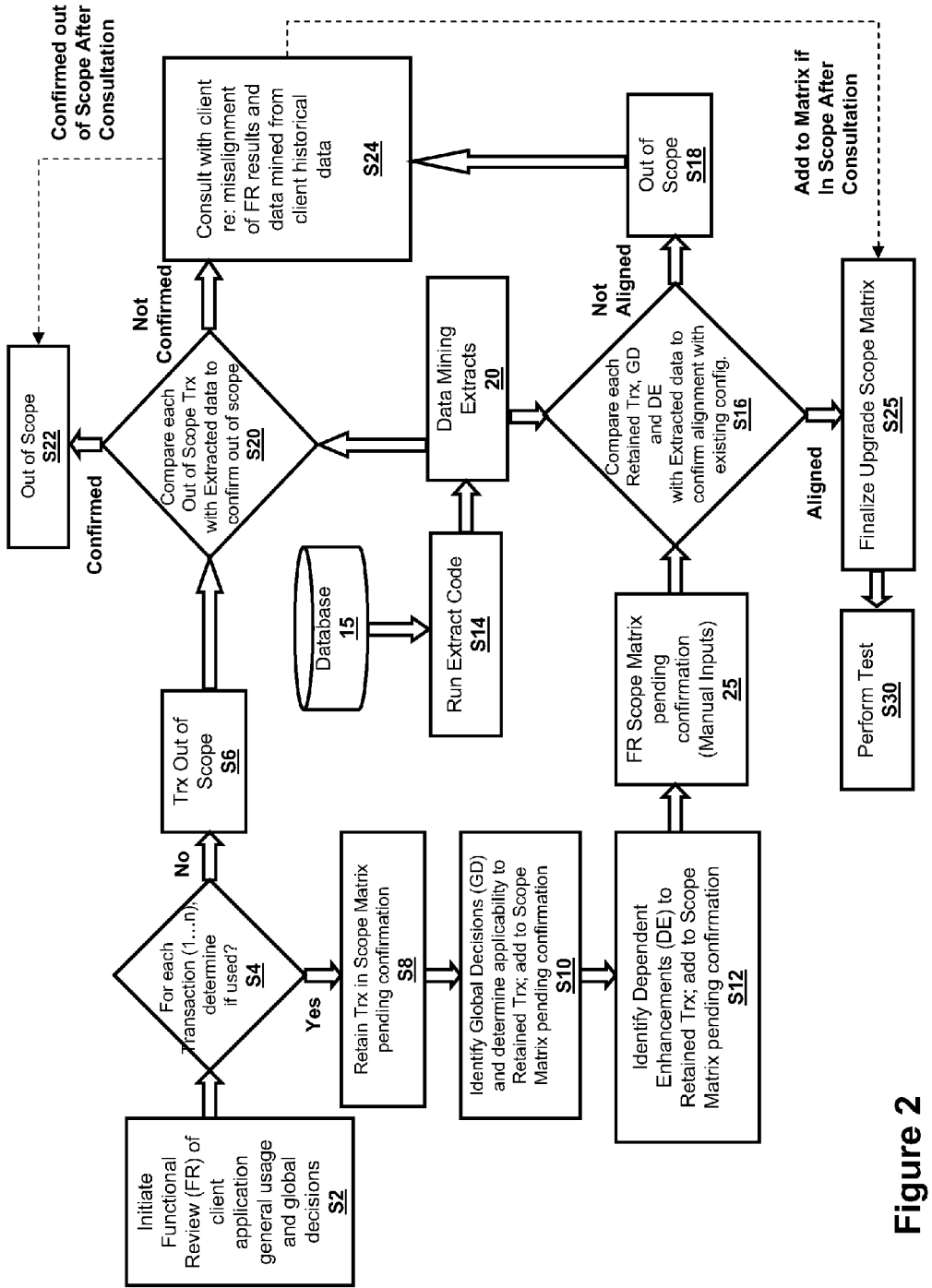
FIG. 2 is a detailed process and component flow for developing an upgrade test matrix in accordance with an embodiment described herein.

Referring to FIG. 2, a more detailed flow of the upgrade process embodiment is described. The process includes both manual (or semi-manual review) sub processes and automated sub processes for constructing the upgrade scope matrix. Initially, a manual, i.e., face-to-face, Functional Review (FR) is commenced with each individual client S2. The purpose of the FR is to ascertain details about the client's perception of their usage of the software application suite and functionality. One skilled in the art recognizes that the face-to-face process could be semi-automated through the use of detailed surveys, e.g., paper or web-based surveys.

More particularly, the FR explores usage through Transactions and Configuration. Taking the TriZetto FACETS product suite as an example, exemplary Transactions may include Parent Group, Group, Subgroup, Class Plan Definition, Subscribers and Members. Exemplary Configurations may include System Administration (SA), Plan IDs, Product IDs, Network Set, Stop Age Waiting Period, and Benefit Summary. Accordingly, client is queried regarding use/non use of each Transaction S4. For Transactions identified by the client as currently not being used, these are labeled as out of scope S6. For Transactions (Trx) identified by the client as currently in use, these Trx are retained in the scope matrix pending confirmation S8. Next, the client is asked to identify Global Decisions (GD) and determine applicability to the retained Trx S10 and to identify Dependent Enhancements (DE) to retained Trx S12; results are added to the scope matrix pending confirmation. An example of a GD for Trx may relate to Group ID. Group ID is an 8 character field and the GD would determine if there smart coding involved and/or if interfaces or extracts are coded for each Group ID? An example of a Configuration GD is Billing Component Modify, which is a decision that informs the user as to how premium rates are modified in accordance with underwriting. Accordingly, an FR based scope matrix is established 25.

In a separate, fully automated data mining exercise, since the provider has a ready-made, populated database 15 containing historical use data for the client, the provider extracts Transactions and Configuration data 20 in accordance with actual historical use (as compared to perceived use by client reported using the FR) using a series of extract scripts, e.g., SQL scripts S14. Again, using the TriZetto FACETS product suite as a non-limiting example, Tables 1 to 8 below provide exemplary script code for representative Transactions within different application groups. These Tables are by no means exhaustive. Additionally, separate script codes would be used for Configuration extracts. Taking the TriZetto FACETS product suite as an example, exemplary Configurations may include System Administration (SA), Plan IDs, Product IDs, Network Set, Stop Age Waiting Period, and Benefit Summary. The scripts may be run on a predetermined amount of historical data, e.g., data spanning a set time period such as a period of months or even years.

TABLE 1

| Application Group | Description/Purpose | SQL |
| --- | --- | --- |
| Accounting | Identify current usage | SELECT DISTINCT CMC_CKNH_NUM_HIST.BPID_STOCK_ID, CMC_CKNH_NUM_HIST.CKNH_START_CK_NO, CMC_CKNH_NUM_HIST.CKNH_STS FROM CMC_CKNH_NUM_HIST |
| Accounting | Identify distinct Payment Status and User Defined Codes used in Payment Application. | SELECT DISTINCT CMC_CKST_STATUS.CKST_STS, CMC_CKST_STATUS.CKST_MCTR_SRSN FROM CMC_CKST_STATUS |

TABLE 2

| Application Group | Description/Purpose | SQL |
| --- | --- | --- |
| Billing | Identify Alternate Funding IDs, User Defined Codes for Type and Termination Reason. | SELECT DISTINCT CMC_AFAI_INDIC.AFAI_ID, CMC_AFAI_INDIC.AFAI_MCTR_TYPE, CMC_AFAI_INDIC.AFAI_MCTR_TRSN FROM CMC_AFAI_INDIC |
| Billing | Identify Requests types, and if route to indicator is used. | SELECT DISTINCT CMC_BLRQ_REQUEST.BLRQ_TYPE, CMC_BLRQ_REQUEST.BLRQ_DELINQ_IND, CMC_BLRQ_REQUEST.BLRQ_USID_ROUTE FROM CMC_BLRQ_REQUEST |
| Billing | Identify all Billing Groups in the System. | SELECT * FROM CMC_BGBG_BIL_GROUP |

TABLE 3

| Application Group | Description/Purpose | SQL |
|---|---|---|
| Capitation/Risk Allocation | Identify all records in Average Member Premium | SELECT * FROM CMC_CRPP_PCT_PREM |
| Capitation/Risk Allocation | Identify common capitation relationships | SELECT * FROM CMC_NWPX_RELATION |
| Capitation/Risk Allocation | Identify any manual adjustment amounts created. | SELECT * FROM CMC_CRPR_PROV_SUM WHERE CMC_CRPR_PROV_SUM.CRPR_MAN_ADJ_AMT != 0.00 |

TABLE 4

| Application Group | Description/Purpose | SQL |
|---|---|---|
| Claims Processing | Identify current usage | SELECT TOP 5 CMC_CLAR_ARCHIVE.CLAR_CREATE_DT, CMC_CLAR_ARCHIVE.CLAR_LAST_ACT_DT, CMC_CLAR_ARCHIVE.CLAR_STATUS FROM CMC_CLAR_ARCHIVE |
| Claims Processing | Identify all Claim Types being submitted. | SELECT DISTINCT CMC_CLCL_CLAIM.CLCL_CL_TYPE FROM CMC_CLCL_CLAIM |
| Claims Processing | Identify Hospital claims processing by viewing subtypes. Subtype of H will confirm Hospital Claims Processing. | SELECT DISTINCT CMC_CLCL_CLAIM.CLCL_CL_SUB_TYPE FROM CMC_CLCL_CLAIM |
| Claims Processing | Identify Common Claim level overrides and EXCDs | SELECT DISTINCT CMC_CLOR_CL_OVR.CLOR_OR_ID, CMC_CLOR_CL_OVR.EXCD_ID FROM CMC_CLOR_CL_OVR |
| Claims Processing | Identify Payment Drag Overrides by using the base Claims table, this will indicate all overrides for Payment Drag date. O - Indicates payment drag override used. | SELECT DISTINCT CMC_CLCL_CLAIM.CLCL_DRAG_OR_IND FROM CMC_CLCL_CLAIM |

TABLE 5

| Application Group | Description/Purpose | SQL |
|---|---|---|
| Medical Plan | Query will identify any Product Variable Components using SEPY Prefix and active in the Class Plan Definition table. | SELECT DISTINCT CMC_CSPI_CS_PLAN.CSPI_ID, CMC_CSPI_CS_PLAN.PDPD_ID FROM CMC_CSPI_CS_PLAN, CMC_PDVC_VAR_COMP, CMC_SEPY_SE_PYMT WHERE CMC_CSPI_CS_PLAN.PDPD_ID = CMC_PDVC_VAR_COMP.PDPD_ID AND CMC_PDVC_VAR_COMP.SEPY_PFX != '' |
| Medical Plan | Query Identifies all Class Plan Categories, Billing Component Prefix, and Premium Rate Table Prefix. | ##################### |

TABLE 6

| Application Group | Description/Purpose | SQL |
|---|---|---|
| Privacy Member Administration | Identify active distinct Member Entity Class Type from Member Definition table. | SELECT DISTINCT FHP_PMED_MEMBER_D.PMED_CTYP FROM FHP_PMED_MEMBER_D |

TABLE 6-continued

| Application Group | Description/Purpose | SQL |
|---|---|---|
| Privacy Member Transactions | Identify distinct Restriction Reasons from Member Restriction Table. | SELECT DISTINCT FHP_PMRS_RESTRICT_X.PMRS_PZCD_RRSN FROM FHP_PMRS_RESTRICT_X |

TABLE 7

| Application Group | Description/Purpose | SQL |
|---|---|---|
| Provider | Identify Common Practitioner ID for top 500 records in the table. Review for trending. | SELECT TOP 500 CMC_PRCP_COMM_PRAC.PRCP_ID FROM CMC_PRCP_COMM_PRAC ORDER BY CMC_PRCP_COMM_PRAC.PRCP_ID |
| Provider | Identify Provider records in the Provider table. Review for trending. | SELECT TOP 500 CMC_PRPR_PROV.PRPR_ID FROM WHERE CMC_PRPR_PROV.PRPR_ENTITY = 'G' ORDER BY PRPR_ID |

TABLE 8

| Application Group | Description/Purpose | SQL |
|---|---|---|
| Subscriber/Member | Identify Distinct Client ID, Group Type, VIP, Area ID, Class ID, Auto Numbering Indicator | SELECT DISTINCT CMC_GRGR_GROUP.CICI_ID CMC_GRGR_GROUP.GRGR_MCTR_TYPE CMC_GRGR_GROUP.GRGR_MCTR_VIP, CMC_GRGR_GROUP.MCAR_AREA_ID, CMC_GRGR_GROUP.CSCS_ID, CMC_GRGR_GROUP.GRGR_MCTR_PTYP, CMC_GRGR_GROUP.GRGR_AUTONUM_IND FROM CMC_GRGR_GROUP |
| Subscriber/Member | Identify Groups that are assigned to a Parent Group | SELECT DISTINCT CMC_PAGR_PARENT_GR.PAGR_ID, PAGR_NAME, CMC_GRGR_GROUP.GRGR_ID, CMC_GRGR_GROUP.GRGR_NAME FROM CMC_PAGR_PARENT_GR, CMC_GRGR_GROUP WHERE CMC_GRGR_GROUP.PAGR_CK = CMC_PAGR_PARENT_GR.PAGR_CK AND CMC_PAGR_PARENT_GR.PAGR_CK != 0 |
| Subscriber/Member | Identify Distinct Billing Levels, Retro Adjustment Months, and Capitation Cycle ID used in the system | SELECT DISTINCT CMC_GRGR_GROUP.GRGR_BILL_LEVEL, CMC_GRGR_GROUP.GRGR_LMT_ADJ_MOS, CMC_GRGR_GROUP.CRCY_ID FROM CMC_GRGR_GROUP |

The FR scope matrix details 25 and the mined data extracts 20 are next compared to determine alignment with the existing client configuration S16. That is, the perceived client use details are compared to the historical truths extracted from the actual historical use data. Where the FR scope matrix details align with extracted truths, these details are included in the final upgrade scope matrix for the client S25. Where alignment is not confirmed, the details (Trx, GD or DE as the case may be) are not initially included in the final upgrade scope matrix, but are instead considered to be out of scope S18.

For both sets of out of scope details from steps S16 and S18, there are additional reviews to confirm that they should remain out of the final upgrade scope matrix. For example, those transactions that were originally deemed out of scope during the FR are compared to the mined data extracts 20 to either confirm out of scope S20, S22 or, if determined to be in scope based on data extracts 20, the transaction is reviewed with the client to make a final determination S24. Similarly, where the details from the FR scope matrix do not align with data extracts 20 and are labeled as out of scope S18, the detail (Trx, GD or DE as the case may be) is reviewed with the client to make a final determination S24. Depending on consultation results, transactions and/or details are either confirmed out of scope S22 or they are added to the final upgrade scope matrix S25. Once the finalized, the upgrade scope matrix is tested S30.

Both the finalized upgrade scope matrix and the script extracted data 20 may be retained in a database (data library). The automated SQL script will inherently capture the actual practical application efforts in a data library that could be leveraged by the provider for many different purposes. For example, extracted data can be crossed-referenced by the software provider with similar data extracts across multiple clients in order to track detailed application and functionality usage data. The software provider can use this cross-referenced data to determine universal upgrades and changes and generally determined where to focus resources to enhance the software suite. For the application to, for example, the TriZetto FACETS product suite, the extracted data does not include any personal health information (PHI), so there are no HIPPA issues affecting use. For individual clients who have previously been through the upgrade process described herein, the individual client's most recent upgrade scope matrix may be used as the starting point for the next upgrade process, thus saving considerable time. Additionally, the upgrade matrices could become templates for similarly situated clients and loaded as part of the upgrade review process to further expedite the review process.

One skilled in the art recognizes that the examples provided in the present disclosure are not limited as such. There are numerous variations to components and functionality described as part of the overall architecture and processes of the platform that are known and would readily be considered to be within the scope of the invention.

The invention claimed is:

1. A process for developing a final upgrade matrix for testing at least one upgrade to the implementation of software use and configuration in an existing customer environment comprising:
    performing a review of the existing customer's perceived use of the software in the existing customer environment to populate an initial upgrade matrix with multiple initial transactions, the initial upgrade matrix being populated by:
        a semi-automated process, wherein a user is queried regarding in-use and non-use to determine the initial transactions by a web-based survey;
        determining, based on the web-based survey, one or more global decisions which are applicable to the in-use initial transactions, wherein global decisions indicate a group identification for a respective transaction; and
        determining dependent enhancements which are applicable to the in-use initial transactions;
    performing by at least one extraction component a data extract process by a processor on a database containing historical data resulting from the existing customer's actual use of the software to determine actual historical transactions;
    comparing, automatically, the multiple in-use initial transactions with the actual historical transactions;
    removing, automatically, each of the multiple in-use initial transactions that does not align with an actual historical transaction from the initial upgrade matrix, wherein the final upgrade matrix includes any remaining and aligned multiple transactions;
    determining, automatically and based on the final upgrade matrix, at least one upgrade to the software; and
    testing, automatically, the at least one upgrade to the software in the existing customer environment.

2. The process according to claim 1, wherein an initial step of the review of the existing customer's perceived use is a determination of use or non-use of individual transactions and all individual transactions determined as non-use are not included in the initial upgrade matrix.

3. The process according to claim 2, wherein the initial step is automated through a web-based survey.

4. The process according to claim 1, wherein the at least one extraction component is an SQL extract.

5. The process according to claim 2, further comprising comparing all individual transactions determined as non-use with the actual historical transactions to confirm non-use thereof, wherein if the comparison does not confirm non-use, performing a client consultation for each non-confirmed transaction and either adding the non-confirmed transaction to the final upgrade matrix or providing final confirmation of non-use based on a result of client consultation.

6. The process according to claim 1, further comprising: for each removed multiple initial transaction that did not align with an actual historical transaction, performing a client consultation for each removed multiple initial transaction and either adding the removed multiple initial transaction to the final upgrade matrix or providing final confirmation of removal based on a result of client consultation.

7. The process according to claim 2, wherein performing the review of the existing customer's perceived use of the software in the existing customer environment further includes identifying global decisions implemented by the customer that relate to those individual transactions identified as used.

8. The process according to claim 7, wherein performing the review of the existing customer's perceived use of the software in the existing customer environment further includes identifying enhancements implemented by the customer that relate to those individual transactions identified as used.

9. The process according to claim 1, wherein the data extract process is applied to historical data resulting from the existing customer's actual use of the software during a predetermined window of time.

10. A process for determining individualized testing scope for one or more software upgrades for a first individual customer comprising:
    polling the first individual customer to populate a first initial testing scope matrix with first current use data, the first initial testing scope matrix being populated by:
        a semi-automated process, wherein the first individual customer is queried regarding in-use and non-use to determine the first current use data;
        determining, based on the web-based survey, one or more global decisions which are applicable to the in-use first current use data, wherein global decisions indicate a group identification for a respective first current use data; and
        determining dependent enhancements which are applicable to the in-use first current use data;
    extracting, automatically, first actual use data by a processor running extract scripts on a database containing first historical use data for the first individual customer;
    comparing, automatically, the first current use data in the initial testing scope matrix with the first extracted actual use data to obtain first aligned data;
    updating, automatically, the first initial testing scope matrix to include only first aligned data, thereby forming a first final testing scope matrix;
    determining, automatically and based on first final testing scope matrix, at least one upgrade to the software; and
    testing, automatically, the at least one upgrade to the software in the first individual customer's environment.

11. The process according to claim 10, wherein the first current use data and the first actual use data include first transactional data and first configuration data.

12. The process according to claim 10, wherein the polling is automated through a web-based survey.

13. The process according to claim 10, wherein the extract scripts are SQL scripts.

14. The process according to claim 10, wherein the extracting actual use data is applied to the first historical data resulting from the first individual customer's actual use of the software during a predetermined window of time.

15. The process according to claim 10, further comprising storing the first extracted actual use data and the first final testing scope matrix in a provider database.

16. The process according to claim 15, further comprising:
polling a second individual customer to populate a second initial testing scope matrix with second current use data;
extracting second actual use data by a processor running extract scripts on a database containing second historical use data for the second individual customer;
comparing the second current use data in the second initial testing scope matrix with the second extracted actual use data to obtain second aligned data;
updating the second initial testing scope matrix to include only second aligned data, thereby forming a second final testing scope matrix; and
storing the second extracted actual use data and the second final testing scope matrix in the provider database.

17. The process according to claim 16, further comprising:
comparing the first and second extracted actual use data by the provider to determine overlapping use data; and
updating polling queries in accordance with overlapping use data.

18. A process for determining generalized testing scope for one or more software upgrades for multiple customers of the software provider comprising:
polling each of the multiple customers to populate a generalized initial testing scope matrix with current use data, the initial testing scope matrix being populated by:
a semi-automated process, wherein each of the multiple customers are queried regarding in-use and non-use to determine the current use data by a web-based survey;
determining, based on the web-based survey, one or more global decisions which are applicable to the in-use current use data, wherein global decisions indicate a group identification for a respective current use data; and
determining dependent enhancements which are applicable to the in-use current use data;
extracting, automatically, actual use data by a processor running extract scripts on a database containing historical use data for each of the multiple customers;
comparing, automatically, the current use data in the generalized initial testing scope matrix with the extracted actual use data to obtain aligned data;
updating, automatically, the generalized initial testing scope matrix to include only aligned data, thereby forming a final generalized testing scope matrix;
determining, automatically and based on the final generalized testing scope matrix, at least one upgrade to the software; and
testing, automatically, the at least one upgrade to the software in at least one of the multiple customers' environments.

19. The process according to claim 18, wherein the current use data and the actual use data include transactional data and configuration data.

20. The process according to claim 18, wherein the extract scripts are SQL scripts.

* * * * *